(12) United States Patent
Qiu et al.

(10) Patent No.: US 12,456,460 B2
(45) Date of Patent: *Oct. 28, 2025

(54) MULTI-TASK LEARNING FOR END-TO-END AUTOMATED SPEECH RECOGNITION CONFIDENCE AND DELETION ESTIMATION

(71) Applicant: Google LLC, Mountain View, CA (US)

(72) Inventors: David Qiu, Brookline, MA (US); Yanzhang He, Mountain View, CA (US); Yu Zhang, Mountain View, CA (US); Qiujia Li, Mountain View, CA (US); Liangliang Cao, Mountain View, CA (US); Ian McGraw, Mountain View, CA (US)

(73) Assignee: Google LLC, Mountain View, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 17/643,826

(22) Filed: Dec. 11, 2021

(65) Prior Publication Data

US 2022/0310080 A1    Sep. 29, 2022

Related U.S. Application Data

(60) Provisional application No. 63/166,399, filed on Mar. 26, 2021.

(51) Int. Cl.
*G10L 15/197* (2013.01)
*G10L 15/02* (2006.01)
(Continued)

(52) U.S. Cl.
CPC ............ *G10L 15/197* (2013.01); *G10L 15/02* (2013.01); *G10L 15/04* (2013.01); *G10L 15/063* (2013.01);
(Continued)

(58) Field of Classification Search
CPC ....... G10L 15/197; G10L 15/02; G10L 15/04; G10L 15/063; G10L 15/16; G10L 15/22; G10L 15/30; G10L 15/32; G10L 2015/025
See application file for complete search history.

(56) References Cited

U.S. PATENT DOCUMENTS 10,332,508 B1 *  6/2019  Hoffmeister ............. G06N 3/08
11,544,504 B1 *  1/2023  Fan ...................... G06F 18/2178
(Continued)

FOREIGN PATENT DOCUMENTS

CN    116888662 A    10/2023
JP    2009-288630 A    12/2009
(Continued)

OTHER PUBLICATIONS

Qi, Weizhen, Yu Yan, Yeyun Gong, Dayiheng Liu, Nan Duan, Jiusheng Chen, Ruofei Zhang, and Ming Zhou. "Prophetnet: Predicting future n-gram for sequence-to-sequence pre-training." arXiv preprint arXiv:2001.04063 (2020). (Year: 2020).*
(Continued)

*Primary Examiner* — Bhavesh M Mehta
*Assistant Examiner* — Paul J. Mueller
(74) *Attorney, Agent, or Firm* — Honigman LLP; Brett A. Krueger; Grant Griffith

(57) ABSTRACT

A method including receiving a speech recognition result corresponding to a transcription of an utterance spoken by a user. For each sub-word unit in a sequence of hypothesized sub-word units of the speech recognition result, using a confidence estimation module to: obtain a respective confidence embedding associated with the corresponding output step when the corresponding sub-word unit was output from the first speech recognizer; generate a confidence feature vector; generate an acoustic context vector; and generate a
(Continued)

respective confidence output score for the corresponding sub-word unit based on the confidence feature vector and the acoustic feature vector received as input by the output layer of the confidence estimation module. The method also includes determining, based on the respective confidence output score generated for each sub-word unit in the sequence of hypothesized sub-word units, an utterance-level confidence score for the transcription of the utterance.

24 Claims, 6 Drawing Sheets

(51) Int. Cl.
*G10L 15/04* (2013.01)
*G10L 15/06* (2013.01)
*G10L 15/16* (2006.01)
*G10L 15/22* (2006.01)
*G10L 15/30* (2013.01)
*G10L 15/32* (2013.01)

(52) U.S. Cl.
CPC .............. *G10L 15/16* (2013.01); *G10L 15/22* (2013.01); *G10L 15/30* (2013.01); *G10L 15/32* (2013.01); *G10L 2015/025* (2013.01)

(56) References Cited

U.S. PATENT DOCUMENTS

| | | | | |
|---|---|---|---|---|
| 2016/0092766 | A1* | 3/2016 | Sainath | G06N 3/048 706/20 |
| 2019/0312973 | A1* | 10/2019 | Engelke | G10L 15/183 |
| 2019/0355348 | A1* | 11/2019 | Sundaram | G10L 15/063 |
| 2020/0027444 | A1* | 1/2020 | Prabhavalkar | G10L 15/02 |
| 2020/0075044 | A1* | 3/2020 | Jankowski, Jr. | G10L 17/04 |
| 2020/0195779 | A1* | 6/2020 | Weisman | G06N 5/01 |
| 2022/0129645 | A1* | 4/2022 | Kim | G06N 3/045 |
| 2022/0415506 | A1* | 12/2022 | Yamamoto | G06N 3/0442 |

FOREIGN PATENT DOCUMENTS

| | | |
|---|---|---|
| JP | 7436760 B1 | 2/2024 |
| KR | 10-2023-0147685 A | 10/2023 |
| WO | 2022182769 A1 | 9/2022 |

OTHER PUBLICATIONS

Mar. 24, 2022 Written Opinion (WO) of the International Searching Authority (ISA) and International Search Report (ISR) issued in International Application No. PCT/US2021/062972.

David Qiu et al: "Learning Word-Level Confidence For Subword End-to-End ASR", arxiv.org, Cornell University Library, 201 Olin Library Cornell University Ithaca, NY 14853, Mar. 11, 2021 (Mar. 11, 2021).

Qiujia Li et al: "Confidence Estimation for Attention-based Sequence-to-sequence Models for Speech Recognition", arxiv.org, Cornell University Library, 201 Olin Library Cornell University Ithaca, NY 14853, Oct. 22, 2020 (Oct. 22, 2020).

Liu Shuo et al: "Hierarchical Component-attention Based Speaker Turn Embedding for Emotion Recognition", 2020 International Joint Conference On Neural Networks (IJCNN), IEEE, Jul. 19, 2020 (Jul. 19, 2020), pp. 1-7.

Seigel M S et al: "Detecting deletions in ASR output", 2014 IEEE International Conference On Acoustics, Speech and Signal Processing (ICASSP), IEEE, May 4, 2014 (May 4, 2014), pp. 2302-2306.

David Qiu et al: "Multi-Task Learning for End-to-End ASR Word and Utterance Confidence with Deletion Prediction", arxiv.org, Cornell University Library, 201 Olin Library Cornell University Ithaca, NY 14853, Apr. 26, 2021 (Apr. 26, 2021).

Office Action issued in related Japanese Patent Application No. 2023-558841, dated Dec. 9, 2024.

\* cited by examiner

MULTI-TASK LEARNING FOR END-TO-END AUTOMATED SPEECH RECOGNITION CONFIDENCE AND DELETION ESTIMATION

CROSS REFERENCE TO RELATED APPLICATIONS

This U.S. patent application claims priority under 35 U.S.C. § 119(e) to U.S. Provisional Application 63/166,399, filed on Mar. 26, 2021. The disclosure of this prior application is considered part of the disclosure of this application and is hereby incorporated by reference in its entirety.

TECHNICAL FIELD

This disclosure relates to multi-task learning for end-to-end automated speech recognition confidence and deletion estimation.

BACKGROUND

Modern automatic speech recognition (ASR) systems focus on providing not only quality/accuracy (e.g., low word error rates (WERs)), but also low latency (e.g., a short delay between the user speaking and a transcription appearing). Moreover, when using an ASR system today there is a demand that the ASR system decode utterances in a streaming fashion that corresponds to displaying a transcription of an utterance in real-time, or even faster than real-time, as a user speaks. To illustrate, when an ASR system is deployed on a mobile phone that experiences direct user interactivity, an application on the mobile phone using the ASR system may require the speech recognition to be streaming such that words, word pieces, and/or individual characters appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience.

SUMMARY

One aspect of the disclosure provides a computer-implemented method for multi-task learning for end-to-end automated speech recognition confidence and deletion estimation. The computer-implemented method when executed on data processing hardware causes the data processing hardware to perform operations including receiving, from a first speech recognizer, a speech recognition result corresponding to a transcription of an utterance spoken by a user. The speech recognition result includes a sequence of hypothesized sub-word units that form one or more words of the transcription of the utterance, each sub-word unit output from the first speech recognizer at a corresponding output step. Using a confidence estimation module, for each sub-word unit in the sequence of hypothesized sub-word units, the operations also include obtaining a respective confidence embedding associated with the corresponding output step when the corresponding sub-word unit was output from the first speech recognizer. The operations further use the confidence estimation module for generating, using a first attention mechanism that self-attends to the respective confidence embedding for the corresponding sub-word unit and the confidence embeddings obtained for any other sub-word units in the sequence of hypothesized sub-word units that proceed the corresponding sub-word unit, a confidence feature vector. The operations continue to use the confidence estimation module for generating, using a second attention mechanism that cross-attends to a sequence of encodings each associated with a corresponding acoustic frame segmented from audio data that corresponds to the utterance, an acoustic context vector. Further, the operations then use the confidence estimation module for generating, as output from an output layer of the confidence estimation module, a respective confidence output score for the corresponding sub-word unit based on the confidence feature vector and the acoustic feature vector received as input by the output layer of the confidence estimation module. The operations also include determining, based on the respective confidence output score generated for each sub-word unit in the sequence of hypothesized sub-word units, an utterance-level confidence score for the transcription of the utterance.

Implementations of the disclosure may include one or more of the following optional features. In some implementations, determining the utterance-level confidence score for the transcription of the utterance includes, for each word of the one or more words of the transcription of the utterance, determining a respective word-level confidence score that is equal to the respective confidence output score generated for the final sub-word unit in the corresponding word. These implementations further include aggregating the respective word-level confidence scores determined for each of the one or more words of the transcription to determine the utterance-level confidence score for the transcription of the utterance.

In some additional implementations, the operations further include estimating, using a hierarchical attention mechanism, a probability that the speech recognition result for the utterance is recognized correctly, determining an utterance-level loss for the speech recognition result based on an estimated probability that the that the speech recognition result for the utterance is recognized correctly and a ground-truth label indicating whether or not the utterance is recognized correctly, and training the confidence estimation model on the utterance-level loss.

In some examples, the confidence estimation model and the first speech recognizer are trained jointly. The operations may include estimating, at each position in a sequence of words of the utterance, a number of deletions, determining a deletion loss for the speech recognition result and the estimated number of deletions and a ground-truth number of deletions at each position in the sequence of words, and training the confidence estimation model on the deletion loss.

In some implementations, the operations further include, after training the confidence estimation model, rescoring candidate speech recognition results recognized by the first speech recognizer. The sub-word units may include wordpieces or graphemes.

In some examples, the first speech recognizer includes a transducer decoder model configured to generate multiple candidate hypotheses, each candidate hypothesis corresponding to a candidate transcription for the utterance and represented by a respective sequence of hypothesized sub-word units. In these implementations, the transducer decoder model may include a Recurrent Neural Network-Transducer (RNN-T) model architecture.

In some implementations, the operations further include determining whether the utterance-level confidence score for the transcription of the utterance satisfies a confidence threshold. In these implementations, when the utterance-level confidence score for the transcription of the utterance fails to satisfy the confidence threshold: the operations further include rejecting the transcription output from the first speech recognizer and instructing a second speech recognizer to process audio data corresponding to the utterance spoken by the user to re-transcribe the utterance spoken by the user. In these implementations, the first speech recognizer may reside on a user device associated with the user, the second speech recognizer may execute on a remote server in communication with the user device, and the user device may transmit the audio data to the remote server when the utterance-level confidence score for the transcription of the utterance fails to satisfy the confidence threshold. Also in these implementations, the second speech recognizer may be more computationally-intensive than the first speech recognizer.

Another aspect of the disclosure provides a system for multi-task learning for end-to-end automated speech recognition confidence and deletion estimation. The system includes data processing hardware and memory hardware in communication with the data processing hardware. The memory hardware stores instructions that when executed on the data processing hardware causes the data processing hardware to perform operations including receiving, from a first speech recognizer, a speech recognition result corresponding to a transcription of an utterance spoken by a user. The speech recognition result includes a sequence of hypothesized sub-word units that form one or more words of the transcription of the utterance, each sub-word unit output from the first speech recognizer at a corresponding output step. Using a confidence estimation module, for each sub-word unit in the sequence of hypothesized sub-word units, the operations also include obtaining a respective confidence embedding associated with the corresponding output step when the corresponding sub-word unit was output from the first speech recognizer. The operations also use the confidence estimation module for generating, using a first attention mechanism that self-attends to the respective confidence embedding for the corresponding sub-word unit and the confidence embeddings obtained for any other sub-word units in the sequence of hypothesized sub-word units that proceed the corresponding sub-word unit, a confidence feature vector. The operations continue to use the confidence estimation module for generating, using a second attention mechanism that cross-attends to a sequence of encodings each associated with a corresponding acoustic frame segmented from audio data that corresponds to the utterance, an acoustic context vector. Further, the operations use the confidence estimation module for generating, as output from an output layer of the confidence estimation module, a respective confidence output score for the corresponding sub-word unit based on the confidence feature vector and the acoustic feature vector received as input by the output layer of the confidence estimation module. The operations also include determining, based on the respective confidence output score generated for each sub-word unit in the sequence of hypothesized sub-word units, an utterance-level confidence score for the transcription of the utterance.

This aspect may include one or more of the following optional features. In some implementations, determining the utterance-level confidence score for the transcription of the utterance includes, for each word of the one or more words of the transcription of the utterance, determining a respective word-level confidence score that is equal to the respective confidence output score generated for the final sub-word unit in the corresponding word. These implementations further include aggregating the respective word-level confidence scores determined for each of the one or more words of the transcription to determine the utterance-level confidence score for the transcription of the utterance.

In some additional implementations, the operations further include estimating, using a hierarchical attention mechanism, a probability that the speech recognition result for the utterance is recognized correctly, determining an utterance-level loss for the speech recognition result based on an estimated probability that the that the speech recognition result for the utterance is recognized correctly and a ground-truth label indicating whether or not the utterance is recognized correctly, and training the confidence estimation model on the utterance-level loss.

In some examples, the confidence estimation model and the first speech recognizer are trained jointly. The operations may include estimating, at each position in a sequence of words of the utterance, a number of deletions, determining a deletion loss for the speech recognition result and the estimated number of deletions and a ground-truth number of deletions at each position in the sequence of words, and training the confidence estimation model on the deletion loss.

In some implementations, the operations further include, after training the confidence estimation model, rescoring candidate speech recognition results recognized by the first speech recognizer. The sub-word units may include wordpieces or graphemes.

In some implementations, the first speech recognizer includes a transducer decoder model configured to generate multiple candidate hypotheses, each candidate hypothesis corresponding to a candidate transcription for the utterance and represented by a respective sequence of hypothesized sub-word units. In these implementations, the transducer decoder model may include a Recurrent Neural Network-Transducer (RNN-T) model architecture.

In some examples, the operations further include determining whether the utterance-level confidence score for the transcription of the utterance satisfies a confidence threshold. In these examples, when the utterance-level confidence score for the transcription of the utterance fails to satisfy the confidence threshold, the operations further include rejecting the transcription output from the first speech recognizer and instructing a second speech recognizer to process audio data corresponding to the utterance spoken by the user to re-transcribe the utterance spoken by the user. In these examples, the first speech recognizer may reside on a user device associated with the user, the second speech recognizer may execute on a remote server in communication with the user device, and the user device may transmit the audio data to the remote server when the utterance-level confidence score for the transcription of the utterance fails to satisfy the confidence threshold. Also in these examples, the second speech recognizer may be more computationally-intensive than the first speech recognizer.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
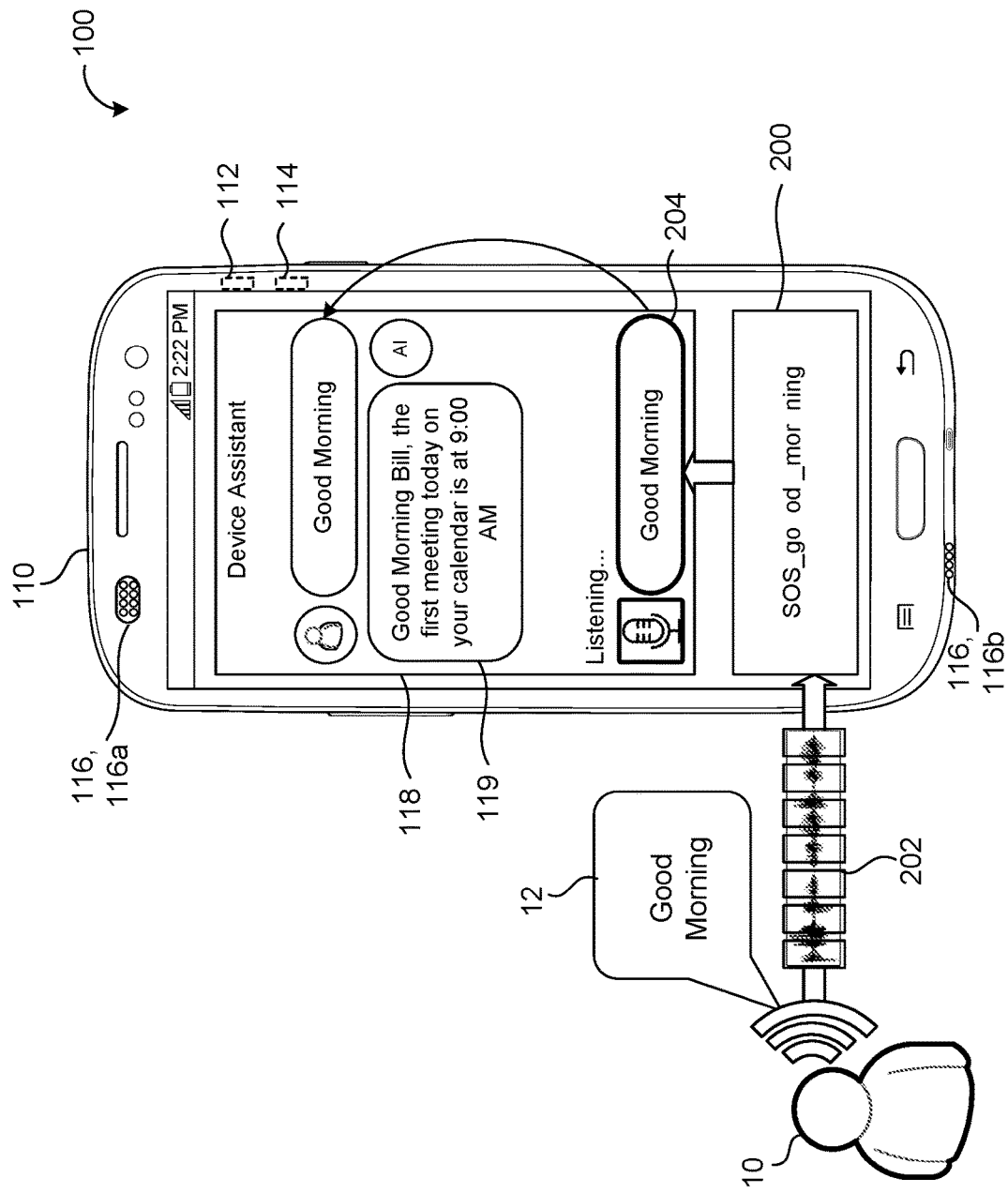
FIG. 1 is a schematic view of an example speech environment.

Automated speech recognition (ASR) systems focus on providing not only quality/accuracy (e.g., low word error rates (WERs)), but also low latency (e.g., a short delay between the user speaking and a transcription appearing). Recently, end-to-end (E2E) ASR models, such as the Recurrent Neural Network-Transducer (RNN-T), the transformer or conformer transducer, and attention-based encoder-decoder models, have gained popularity in achieving state-of-the-art performance in accuracy and latency. In contrast to conventional hybrid ASR systems that include separate acoustic, pronunciation, and language models, E2E models apply a sequence-to-sequence approach to jointly learn acoustic and language modeling in a single neural network that is trained end to end from training data, e.g., utterance-transcription pairs.

Examples of sequence-to-sequence models include "attention-based" models and "listen-attend-spell" (LAS) models. A LAS model transcribes speech utterances into characters using a listener component, an attender component, and a speller component. Here, the listener is a recurrent neural network (RNN) encoder that receives an audio input (e.g., a time-frequency representation of speech input) and maps the audio input to a higher-level feature representation. The attender attends to the higher-level feature to learn an alignment between input features and predicted subword units (e.g., a grapheme or a wordpiece). The speller is an attention-based RNN decoder that generates character sequences from the input by producing a probability distribution over a set of hypothesized words. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system.

Moreover, when using an ASR system today there is a demand that the ASR system decode utterances in a streaming fashion that corresponds to displaying a transcription of an utterance in real-time, or even faster than real-time, as a user speaks. To illustrate, when an ASR system is deployed on a mobile phone that experiences direct user interactivity, an application on the mobile phone using the ASR system may require the speech recognition to be streaming such that words, word pieces, and/or individual characters appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience. However, sequence-to-sequence models such as the LAS model that function by reviewing an entire input sequence of audio before generating output text, do not allow for streaming outputs as inputs are received. Due to this deficiency, deploying the LAS model for speech applications that are latency sensitive and/or require real-time voice transcription may pose issues. This makes an LAS model alone not an ideal model for mobile technology (e.g., mobile phones) that often relies on real-time applications (e.g., real-time communication applications).

Another form of a sequence-to-sequence model known as a recurrent neural network transducer (RNN-T) does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken. Here, an RNN-T uses a feedback loop that feeds symbols predicted by the model back into itself to predict the next symbols. Because decoding the RNN-T includes a beam search through a single neural network instead of a large decoder graph, an RNN-T may scale to a fraction of the size of a server-based speech recognition model. With the size reduction, the RNN-T may be deployed entirely on-device and be able to run offline (i.e., without a network connection); therefore, avoiding unreliability issues with communication networks.

The RNN-T model alone, however, still lags behind a large state-of-the-art conventional model (e.g., a server-based model with separate AM, PM, and LMs) in terms of quality (e.g., speech recognition accuracy). Yet a non-streaming E2E, LAS model has speech recognition quality that is comparable to large state-of-the-art conventional models. To capitalize on the quality of a non-steaming E2E LAS model, a two-pass speech recognition system (e.g., shown in FIG. 2A) was developed that includes a first-pass component of an RNN-T network followed by a second-pass component of a LAS network. With this design, the two-pass model benefits from the streaming nature of an RNN-T model with low latency while improving the accuracy of the RNN-T model through the second-pass incorporating the LAS network. Although the LAS network increases the latency when compared to only a RNN-T model, the increase in latency is reasonably slight and complies with latency constraints for on-device operation. With respect to accuracy, a two-pass model achieves a 17-22% WER reduction when compared to a RNN-T alone and has a similar WER when compared to a large conventional model.

Confidence scores are an important feature of ASR systems that support many downstream applications to mitigate speech recognition errors. For example, unlabeled utterances with recognition results output from an ASR model that achieve high confidence may be used for semi-supervised training of the ASR model which may reduce the expense of using only transcribed utterances for training. On the other hand, in applications such as spoken dialog systems in which a user interacts with a digital assistant executing on a computing device, utterances with recognition results that achieve low word-level confidence may prompt the user to correct any mis-transcribed words. Additionally, recognition results with low confidence may result in passing audio for the corresponding utterance to a different, more computationally extensive ASR model (e.g., server-side) for improving recognition on the utterance.

While conventional hybrid ASR systems can easily estimate word-level confidence scores from word posterior probabilities computed from lattices or confusion networks and then aggregated to provide an utterance-level confidence, the deep neural networks employed by E2E ASR models tend to exhibit overconfidence when predicting words. As many E2E ASR models are configured to output recognition results at the sub-word level, simply learning confidence scores for each sub-word recognized by the ASR model using a corresponding fixed sub-word tokenization for the word as a reference sequence can lead to incorrect ground truth labels used for training confidence estimation models since recognition results may contain multiple valid tokenizations. For instance, a reference fixed sub-word sequence for the utterance "Good morning" may be "go, od, morn, ing" while a hypothesized sub-word sequence recognized by the ASR model may be "go, od, mor, ning, mom". Here, even though the word "morning" is correctly recognized by the ASR model, the sub-word labels for the corresponding hypothesized sub-words "mor" and "ning" recognized by the ASR model would be labeled incorrect because they do not match the corresponding reference fixed sub-words "morn" and "ing" for the word "morning".

To alleviate the drawbacks associated with estimating sub-word confidence scores for hypothesized sub-word sequences recognized by ASR models due to mismatches between reference fixed sub-word sequences, implementations herein are directed toward a confidence estimation module that applies self-attention in order to estimate word-level confidence for each recognized word using only the confidence of the final hypothesized sub-word unit recognized by the ASR model that makes up the corresponding word. The contents of U.S. application Ser. No. 17/182,592, filed on Feb. 23, 2021 are incorporated by reference in their entirety. Learning only the word-level confidence of each hypothesized word recognized by the ASR model provides an estimate of a ratio of correct words to a total number of words in the hypothesis. However, training labels do not provide any signals about whether the entire utterance is recognized correctly, or whether there are any deletions in the hypothesis recognized by the ASR model. Thus, estimating word-level confidence does not model deletions, and an overall utterance confidence based on an aggregation of the word-level confidences for the words in the utterance, discards many useful word-level training signals. Implementations herein are further directed toward applying multi-task learning for joint training the confidence model using objectives related to word training, utterance training, and deletion training.

FIG. 1 is an example speech environment 100 in which a user 10 interacts with a user device 110 through voice input. The user device 110 (also referred to generally as device 110) includes a computing device that is configured to capture sounds (e.g., streaming audio data) from one or more users 10 within the speech-enabled environment 100. Here, the streaming audio data 202 may refer to a spoken utterance by the user 10 that functions as an audible query, a command for the device 110, or an audible communication captured by the device 110. Speech-enabled systems of the device 110 may field the query or the command by answering the query and/or causing the command to be performed.

The user device 110 may correspond to any computing device capable of receiving audio data 202. Some examples of user devices 110 include, but are not limited to, mobile devices (e.g., mobile phones, tablets, laptops, etc.), computers, wearable devices (e.g., smart watches), smart appliances, internet of things (IoT) devices, smart speakers/displays, vehicle infotainment systems, etc. The user device 110 includes data processing hardware 112 and memory hardware 114 in communication with the data processing hardware 112 and storing instructions, that when executed by the data processing hardware 112, cause the data processing hardware 112 to perform one or more operations. The user device 110 further includes an audio subsystem 116 with an audio capture device (e.g., microphone) 116, 116a for capturing and converting spoken utterances 12 within the speech-enabled system 100 into electrical signals and a speech output device (e.g., a speaker) 116, 116b for communicating an audible audio signal (e.g., as output audio data from the device 110). While the user device 110 implements a single audio capture device 116a in the example shown, the user device 110 may implement an array of audio capture devices 116a without departing from the scope of the present disclosure, whereby one or more capture devices 116a in the array may not physically reside on the user device 110, but be in communication with the audio subsystem 116. In the example shown, the user device 110 (e.g., using the hardware 112, 114) implements a speech recognizer 200 that is configured to perform speech recognition on audio data 202 corresponding to an utterance 12 spoken by the user 10. Here, the audio capture device 116a is configured to capture acoustic sounds representing the utterance 12 and convert the acoustic sounds into the audio data 202 associated with a digital format compatible with the speech recognizer 200. The digital format associated with the audio data 202 may correspond to acoustic frames (e.g., parameterized acoustic frames), such as mel frames. For instance, the parameterized acoustic frames correspond to log-mel filterbank energies.

While FIG. 1 shows the user device 100 implementing the speech recognizer 200 for performing speech recognition on-device, other implementations include a remote server 410 (FIG. 4) implementing the speech recognizer 200 by processing the audio data 202 transmitted by the user device 110 via a network and providing a transcription 204 of the audio data 202 back to the user device 110. In some additional implementations, the user device 110 utilizes both a local speech recognizer 200 residing on the user device 110 and a server-side speech recognizer 402 (FIG. 4) that executes on the remote server 410. Here, user device 110 may use the local speech recognizer 200 when a network connection is not available or for speech applications that are latency sensitive and/or require streaming transcription, while the server-side speech recognizer 402 may be leveraged when additional resources are required to improve speech recognition accuracy as described in greater detail below with reference to FIG. 4.

In some examples, the user 10 interacts with a program or application 118 executing on the user device 110 that uses the speech recognizer 200. For instance, FIG. 1 depicts the user 10 communicating with an automated assistant application 118. In this example, the user (e.g., Bill) 10 greets the automated assistant application 118 by speaking an utterance 12, "Good morning", that is captured by the audio capture device 116a and converted into corresponding audio data 202 (e.g. as acoustic frames) for processing by the speech recognizer 200. In this example, the speech recognizer 200 transcribes the audio data 202 representing the utterance 12 into a transcription 204 (e.g., a text representation of "Good morning"). Here, the automated assistant application 118 may apply natural language processing on the transcription 204 to generate a response 119 for output to the user 10 that conveys the message, "Good Morning Bill, the first meeting today on your calendar is at 9:00 AM." Natural language processing generally refers to a process of interpreting written language (e.g., the transcription 204) and determining whether the written language prompts any action. In this example, the assistant application 118 uses natural language processing to recognize that the utterance 12 spoken by the user 10 is intended to invoke the assistant application 118 to accesses a calendar application of the user 10 and provide the response 119 indicating what time the user's 10 first meeting is today. That is, by recognizing these details with natural language processing, the assistant application 118 returns the response 119 to the user 12 as a synthesized speech representation for audible output through the audio output device 116a and/or as text for display on a screen in communication with the user device 110. In some examples, the user device 110 displays transcriptions 204 of utterances 12 spoken by the user 10 and corresponding responses 119 from the assistant application 118 as a conversation on the screen. In some configurations, natural language processing may occur on a remote system in communication with the data processing hardware 112 of the user device 110.

In some examples, the speech recognizer 200 processes incoming audio data 202 in real-time to provide a streaming transcriptions 204. Here, the speech recognizer 200 is configured to produce a sequence of hypothesized sub-word units that make up the words of the utterance 12 spoken by the user 10. The hypothesized sub-word units may include word pieces or individual characters (e.g., graphemes). In the example shown, the sequence of hypothesized sub-word units recognized by the speech recognizer include "SOS_go od_mor ning" in which the 'SOS' indicates a start of speech tag and each word boundary indicator ('_') indicates a beginning/starting sub-word unit for each word.

Figure 2:
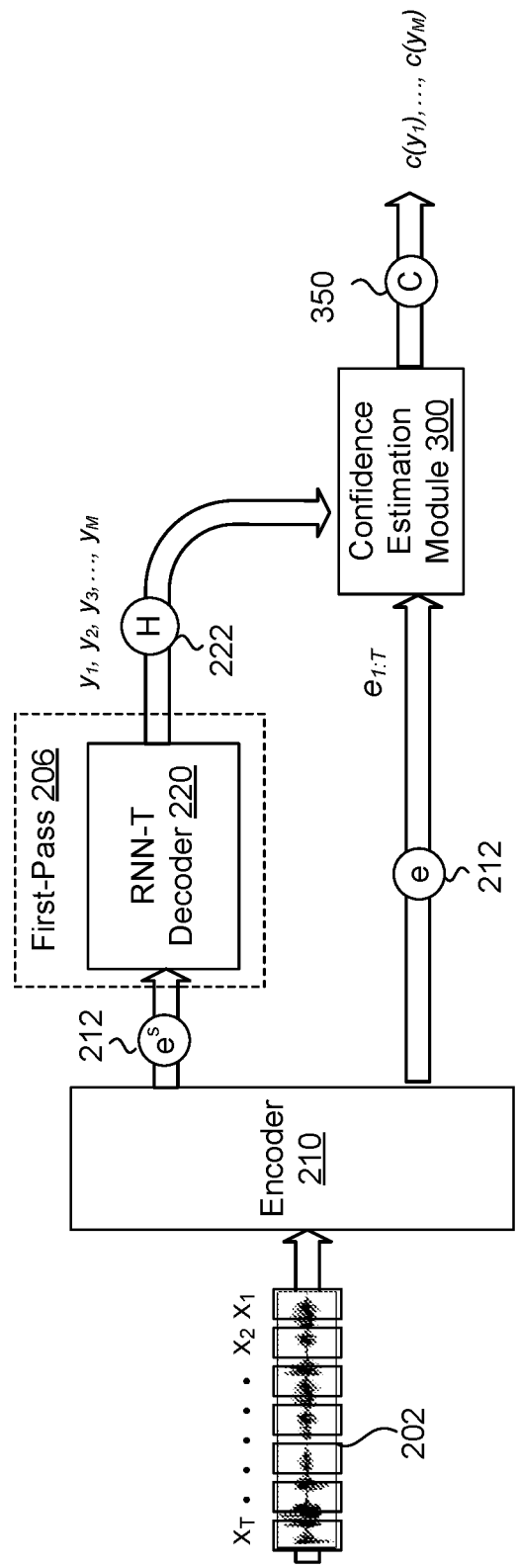
FIG. 2 is a schematic view of an example speech recognizer and a confidence estimation model overlain on the speech recognizer.

Referring to FIG. 2, in some implementations, a speech recognizer 200 includes a recurrent neural network-transducer (RNN-T) decoder 220 for predicting a speech recognition result/hypothesis 222 and implements a confidence estimation module (CEM) 300 for estimating a confidence 302 of the speech recognition result/hypothesis 222. The CEM 300 may use the utterance-level confidence 302 to rescore the speech recognition result/hypothesis 222 predicted by the speech recognizer 200. Here, the speech recognition result/hypothesis 222 corresponds to a sequence of sub-word units, such as word pieces or graphemes, that when aggregated together form a transcription 204 for an utterance. Generally speaking, the speech recognizer 200 includes an encoder 210 and the RNN-T decoder 220, whereby the RNN-T decoder 220 includes a prediction network and a joint network. The RNN-T decoder 220 may produce multiple candidate hypotheses H as output 222 and the CEM 300 may rescores/re-ranks a top-K candidate hypotheses H to identify a highest scoring candidate hypothesis as a final recognition result corresponding to the transcription 204 (FIG. 1). Moreover, while examples herein depict the decoder 220 having an RNN-T model architecture, the decoder 220 may similarly include other types of transducer model architectures without departing from the scope of the present disclosure. For instance, the decoder 220 may include one of Transformer-Transducer, Convolutional Neural Network-Transducer (ConvNet-Transducer), or Conformer-Transducer model architectures in lieu of the RNN-T model architecture.

The at least one shared encoder 210 is configured to receive, as input, the audio data 202 corresponding to the utterance 12 as a sequence of acoustic frames. The acoustic frames may be previously processed by the audio subsystem 116 into parameterized acoustic frames (e.g., mel frames and/or spectral frames). In some implementations, the parameterized acoustic frames correspond to log-mel filterbank energies with log-mel features. For instance, the parameterized input acoustic frames representing the audio data 202 input into the encoder 210 may be represented as $x=(x_1, \ldots, x_T)$, where $x_t \in \mathbb{R}^d$ are log-mel filterbank energies, T denotes the number of frames in x, and d represents the number of log-Mel features. In some examples, each parameterized acoustic frame includes 128-dimensional log-mel features computed within a short shifting window (e.g., 32 milliseconds and shifted every 10 milliseconds). Each feature may be stacked with previous frames (e.g., three previous frames) to form a higher-dimensional vector (e.g., a 512-dimensional vector using the three previous frames). The features forming the vector may then be downsampled (e.g., to a 30 millisecond frame rate). For each acoustic frame $x_{1:T}$ of the audio data 202 input to the encoder 210, the encoder 210 is configured to generate, as output 212, a corresponding encoding $e_{1:T}$. Each of the number of frames in x denoted by T corresponds to a respective time step.

Although the structure of the encoder 210 may be implemented in different ways, in some implementations, the encoder 210 includes a long-short term memory (LSTM) neural network. For instance, the LSTM neural network may include eight (8) LSTM layers. Here, each layer may have 2,048 hidden units followed by a 640-dimensional projection layer. In some examples, a time-reduction layer is inserted with the reduction factor N=2 after the second LSTM layer of the encoder 210.

In some implementations, the RNN-T decoder 220 includes a prediction network and a joint network. Here, the prediction network may have two LSTM layers of 2,048 hidden units and a 640-dimensional projection per layer as well as an embedding layer of 128 units. The outputs 212 of the shared encoder 210 and the prediction network may be fed into the joint network that includes a softmax predicting layer. In some examples, the joint network of the RNN-T decoder 220 includes 640 hidden units followed by a softmax layer that predicts 4,096 mixed-case word pieces.

The RNN-T decoder 220 receives, as input, the encoding e generated as output 212 from the encoder 210 for each acoustic frame x and generates, as output 222, one or more candidate hypotheses H each represented by a respective sequence of hypothesized sub-word units $y_1, y_2, y_3, \ldots, y_M$. For instance, in the example where the user 10 utters "Good morning", one candidate hypothesis H may include a first sequence of hypothesized sub-word units [_go, od, _mor, ning] and another candidate hypothesis H may include a second sequence of hypothesized sub-word units [_go, od, _morn, ing]. There may be a multitude of other candidate hypothesis H as well. Here, the respective sequence of hypothesized sub-word units $y_1, y_2, y_3, \ldots, y_M$ representing each candidate hypothesis H corresponds to a candidate transcription for the utterance 12. Each sub-word unit $y_i$ in each respective sequence of hypothesized sub-word units $y_1, y_2, y_3, \ldots, y_M$ denotes a probability distribution over possible sub-units. The sub-word unit with the highest probability in the probability distribution may be selected as the hypothesized sub-word in the respective sequence of hypothesized sub-word units.

With continued reference to FIG. 2, the CEM 300 may receive, as input, the sequence of encodings e, $e_{1:T}$ 212 output from the encoder 210 and the top-K candidate hypotheses H generated as output 222 from the RNN-T decoder 220. In one example, K is equal to four (4) so that the top four candidate hypotheses H are provided as input to the CEM 300 for rescoring by determining an utterance-level confidence 350 for each hypotheses H. The candidate hypothesis H associated with a highest confidence 350 may be output as the transcription 204.

To decrease the size of the softmax layer, the sub-word unit vocabulary of possible sub-word units is typically smaller compared to a word vocabulary. The sub-word unit vocabulary may include graphemes or wordpieces (WP). An example WP vocabulary may include 4,096 WPs. While examples of the present disclosure use WPs as the sub-word units generated as output from the speech recognizer, graphemes can be similarly utilized as the sub-word units output from the speech recognizer without departing from the scope of the present disclosure. Accordingly, to compute a word error rate (WER) for a candidate hypothesis H, the respective sequence of hypothesized sub-word units (e.g., WPs) needs to be converted into its corresponding word sequence $w_1, w_2, \ldots, w_L$. This procedure for converting a sub-word sequence into a word sequence is uniquely determined since the first sub-word unit (e.g., WP) of each word begins with the word boundary indicator ('_'). Similarly, for a word $w_j$ including $Q_j$ WPs, where $y_j$, q denotes the q-th WP of the j-th word, a simple technique for computing word confidence can be expressed as follows.

$$C_{word}(w_j) = agg(c(y_{j,1}), \ldots, c(y_j, Q_j)) \quad (1)$$

Wherein agg can be arithmetic mean, minimum, product, or a neural network. However, since each word $w_j$ can be divided into multiple different valid WP combinations due to a mismatch between WP correctness and word correctness, using Equation 1 to estimate word-level confidence creates an undesirable computational burden during training since a search over all possible reference tokenizations for the one having a fewest WP edits is required. As used herein, a WP edit includes a correct (cor) label when a hypothesized WP matches a reference WP, a substitution (sub) label when a valid hypothesized WP does not match a reference WP, and an insertion (ins) when a hypothesized WP is misrecognized. Table 1 below shows an example where the word "morning" is correctly transcribed, but results in two substitutions in the WP edit distance output.

TABLE 1

| Hyp: | _go | od | _mor | ning | _mom |
|---|---|---|---|---|---|
| Ref: | _go | od | _morn | ing | |
| WP edit: | cor | cor | sub | sub | ins |
| Word edit: | — | cor | — | cor | ins |
| d($w_j$): | — | 1 | — | 1 | 0 |
| m($y_i$): | 0 | 1 | 0 | 1 | 1 |
| $\mathcal{L}(y_i)$: | 0 | log c($y_2$) | 0 | log c($y_4$) | log(1 − c($y_5$)) |

To cure the inherent mismatch between WP correctness and word correctness resulting from speech recognizers 200 that output at the WP level as depicted in Table 1, implementations herein are directed toward a transformer-based CEM 300 that leverages a confidence output at the final WP of every word as a word-level confidence while ignoring the confidence of all other preceding WPs of every word. During training, the speech recognizer 200 is frozen and ground-truth WP labels of correct, insertion, and substitution are used.

Figure 3:
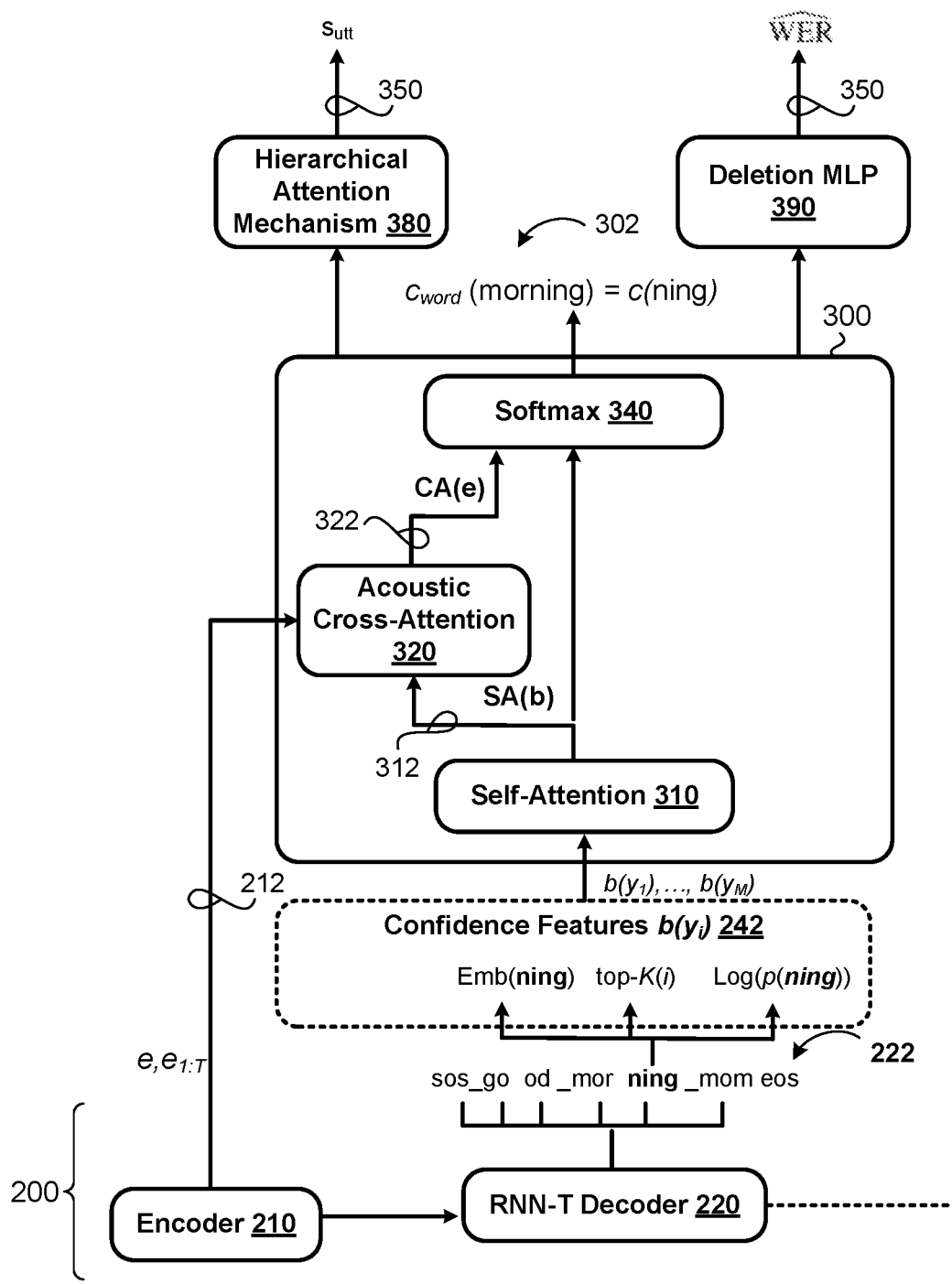
FIG. 3 is a schematic view of training the confidence estimation module of FIG. 2 using multi-task learning.

FIG. 3 shows an example of the transformer-based CEM 300 overlain on top of the speech recognizer 200. For clarity, FIG. 3 depicts only the actions of the CEM 300 predicting a confidence output $c(y_i)$ 302 for the i-th WP in a respective sequence of hypothesized WPs $y_1, y_2, y_3, \ldots, y_M$ output by the RNN-T decoder 220. Specifically, FIG. 3 depicts the CEM 300 predicting the confidence output c("ning") for the "ning" WP in the respective sequence of hypothesized WPs [_go, od, _mor, ning] that converts into the corresponding word sequence "good morning".

The RNN-T decoder 220 generates, as output 222, one or more candidate hypotheses H each represented by a respective sequence of hypothesized sub-word units $y_1, y_2, y_3, \ldots, y_M$. Here, the RNN-T decoder 220 may generate four candidate hypotheses as output 222. In the example shown, for the utterance 12 "Good morning", one candidate hypothesis H generated as output 222 from the RNN-T decoder 220 may include a first sequence of hypothesized sub-word units [_go, od, _mor, ning] and another candidate hypothesis H may include a second sequence of hypothesized sub-word units [_go, od, _morn, ing]. At the same time, the encoder 210 generates the sequence of encodings $e_{1:T}$ 212 conveying acoustic context where T corresponds to a number of acoustic frames x segmented from the utterance 12.

For each sub-word unit ($y_i$) in the sequence of hypothesized sub-word (e.g., WP) units [sos_go, od, _mor, ning eos] representing the candidate hypothesis H generated as output 222 from the RNN-T decoder 220, a confidence embedding b($y_i$) 301 representing a set of confidence features obtained from the speech recognizer 200 is provided as input to the CEM 300 for determining a respective confidence output c($y_i$) 302. In the example shown, the i-th sub-word unit corresponds to the WP "ning". Here, the confidence embedding b($y_i$) 301 conveys one or more of an input subword+positional embedding Emb($y_i$) feature (e.g., Emb(ning)), a log posterior log (p($y_i$)) feature, and a top-K(i) feature. The log posterior log (p($y_1$)) feature indicates a probability value associated with the probability/likelihood that sub-word unity, includes the WP "ning", and the top-K(i) feature indicates the K largest log probabilities at decoder index (e.g., time step) i. Stated differently, the top-K(i) feature provides probability values for each candidate hypothesis H in the top-K at decoder index (e.g., time step) i. Since both the speech recognizer 200 and the CEM 300 are configured to generate an output for each time step at the sub-word (e.g., WP) level, implementing the CEM 300 as a transformer permits: (1) the use of word edit distance output as ground truth training labels (i.e., correction, substitution, and insertion labels) by leveraging the confidence output $c(y_j, Q_j)$ at the final WP of every word $c_{word}(w_j)$ as a dedicated word-level confidence 302; and (2) the incorporation of information/features from every WP that makes up the word. In the example shown, a self-attention mechanism 310 of the transformer-based CEM 300 applies self-attention to a confidence feature vector b based on the confidence embedding b($y_i$) 301 for the i-th sub-word unit corresponding to the WP "ning" as well as confidence embeddings for earlier sub-word units in the same word. The confidence feature vector b may be expressed as follows.

$$b = \{b(y_1), \ldots, b(y_i)\} \quad (2)$$

Additionally, an acoustic cross-attention mechanism 320 of the transformer-based CEM 300 applies acoustic cross-attention (CA(e)) to the sequence of encodings e, $e_{1:T}$ 212 output from the encoder 210 to generate an acoustic context vector 322 for improving the accuracy in estimating the respective confidence output c($y_i$) 302 for the i-th sub-word unit corresponding the WP "ning". Finally, a Softmax output layer 340 uses the self-attention confidence feature vector SA(b) and the cross-attention CA(e) acoustic context vector 322 to permit the transformer-based CEM 300 to produce the dedicated confidence output $c(y_i)$ 302 for the i-th subword unit as follows.

$$[f(y_1), \ldots, f(y_M)] = \text{Transformer}(CA(e), SA(b)) \quad (3)$$

$$[c(y_i), i(y_i), s(y_i)] = \text{Softmax}(f(y_i)), \quad (4)$$

where the Softmax output layer 340 is trained with the correction, substitution, and insertion ground-truth WP labels associated with WP edit distance. The CEM 300 may determine a confidence 302 for each word $c_{word}(w_j)$ using a confidence output $c(y_j, Q_j)$ at the final WP and estimate a word correct ratio ($\overline{WCR}$) as follows.

$$c_{word}(w_j) = c(y_j, Q_j) \quad (5)$$

$$\overline{WCR} = \frac{\sum_{j=1}^{L} c_w(w_j)}{L} \quad (6)$$

where the confidence 302 for the word $c_{word}$(morning) in the example shown corresponds to the confidence output c(ning) of the final WP that makes up the word. The $\overline{WCR}$ includes one type of utterance-level confidence score.

The CEM 300 may be trained jointly with the speech recognizer 200, or the CEM 300 and the speech recognizer may be trained separately from one another. In some examples, the CEM 300 is trained using a binary cross-entropy word-level loss as follows.

$$\mathbb{R} = -\Sigma_{j=1}^{L} d(w_j) \log c_{word}(w_j) + (1 - d(w_j)) \log (1 - c_{word}(w_j)). \quad (7)$$

where Table 1 shows that $d(w_j)$ is equal to one when a Levenshtein word-level edit distance for the word $w_j$ outputs the "correct" (cor) label when the hypothesized word matches the reference word, and $d(w_j)$ is equal to zero when the Levenshtein word-level edit distance for the word $w_j$ outputs the "insertion" (ins) or "substitution" (sub) labels when the hypothesized word does not match the reference word. Notably, since the speech recognizer 200 and the CEM 300 output at the sub-word level (e.g., output every WP), Table 1 also shows the CEM 300 applying an end-of word mask loss m to focus only on the final WP making up the word and ignore WP losses associated with earlier WPs that make up the same word.

The CEM may be further trained on an utterance-level loss using the following ground truth.

$$e = \begin{cases} 1, & \text{if utterance } WER = 0 \\ 0, & \text{otherwise} \end{cases} \quad (8)$$

Here, the presence of any deletions causes a value of e to be zero, and the signal is back propagated to internal features of the CEM 300. To extract utterance features and make the prediction, a hierarchical attention mechanism 380 performs the following:

$$u_i = \tanh(W_1 f(y_i) + b) \quad (9)$$

$$\alpha_i = \frac{\exp(w_2^T u_i)}{\sum_{m=1}^{M} \exp(w_2^T u_m)} \quad (10)$$

$$s_{utt} = \sigma\left(MLP\left(\sum_{i=1}^{M} \alpha_i f(y_i)\right)\right) \quad (11)$$

wherein parameters $W_1$, b, and $w_2$ that generate $s_{utt}$ can be trained with binary cross-entropy loss: $L = -[e \log s_{utt} + (1-e) \log(1-s_{utt})]$ where $s_{utt}$ provides an estimate of the probability that an entire utterance is recognized with zero WER, which is useful for ranking utterances. The $s_{utt}$ does not, however, yield an estimate of the raw WER. Intuitively, the utterance feature $s_{utt}$ is a summary of the sequence of token features $y_1$-$y_M$. The MLP for the hierarchical attention mechanism 380 includes two layers and may include hidden and output dimensions of 320 and 1, respectively.

The CEM may further estimate a raw word error rate (WER) for the hypothesis H based on an estimate of a number of deletions. Here, a tertiary task may be defined with a ground truth $e_j$ as a number of deletions between the j−1 and j-th word. Generally, a number of deletions at any position may include any non-negative integer. To extract deletion features and make predictions, a MLP may be trained with Poisson regression loss as follows.

$$r_w(w_j) = MLP(f(w_j)) \quad (12)$$

$$\mathbb{R} = -\Sigma_{j=1}^{L}[e_j r_w(w_j) - \exp(r_w(w_j))]. \quad (13)$$

the f(wj) is generated using self-attention, and has linguistic information up to the j-th word. Accordingly, it is well suited for predicting ej, the number of deletions right before the jth word.

Accordingly, the WER estimate may be computed as follows.

$$\widehat{WER} = \frac{\hat{D} + \hat{I} + \hat{S}}{L + \hat{D} - \hat{I}}, \quad (14)$$

where $\hat{D} = \sum_{j=1}^{L+1} \exp(r_w(w_j))$, $\hat{I} = \sum_{j=1}^{L} i_w(w_j)$, and $\hat{S} = \sum_{j=1}^{L} s_w(w_j)$.

Figure 4:
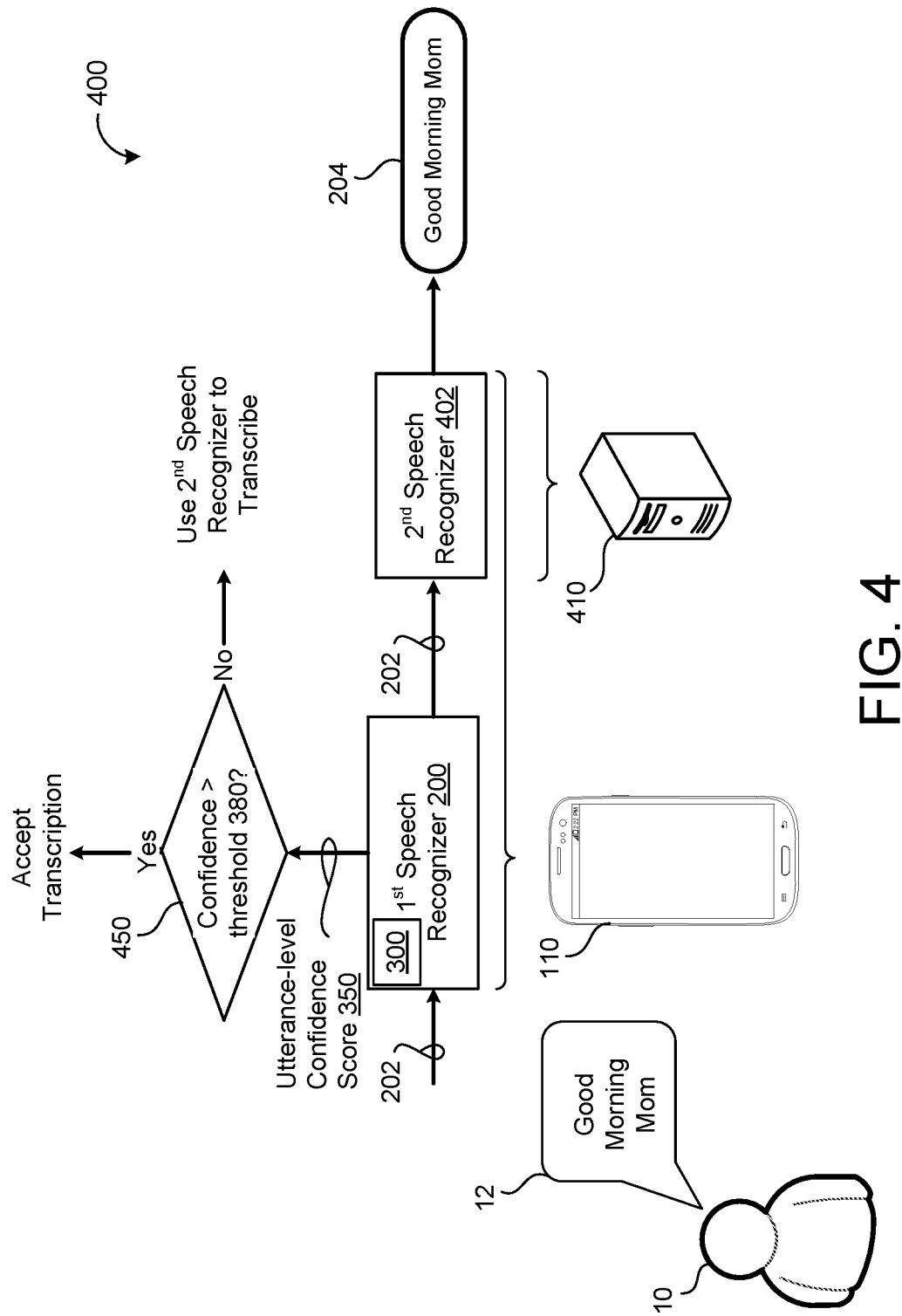
FIG. 4 is a schematic view of an example confidence-based routine for selecting an appropriate speech recognizer based on utterance-level confidence.

FIG. 4 shows a schematic view 400 of an example confidence-based routine for selecting an appropriate speech recognizer to transcribe an utterance 12. In the example shown, a first speech recognizer 200 operates as a default speech recognizer for generating a transcription 204 by processing incoming audio data 202 corresponding to an utterance 12 spoken by a user 10. The first speech recognizer 200 may correspond to a local speech recognizer that executes on a user device 110 associated with the user 10. The first speech recognizer 200 also implements the CEM 300 for determining an utterance-level confidence score 350 for a speech recognition result 222 output by the first speech recognizer 200 that corresponds to the transcription 204.

In some implementations, the confidence-based routine determines whether the utterance-level confidence score 350 for the utterance 12 transcribed by the first speech recognizer 200 satisfies a confidence threshold. In the example shown, utterance-level confidence scores 350 greater than the confidence threshold satisfy the confidence threshold while utterance-level confidence scores 350 less than or equal to the confidence threshold fail to satisfy the confidence threshold. When the utterance-level confidence score 350 satisfies (e.g., is greater than) the confidence threshold (e.g., decision block 450 is "Yes"), then the transcription 204 generated by the first speech recognizer 200 is accepted to achieve on-device gains in quality, latency, and reliability. Here, the accepted transcription 204 may display, or continue to display, on the user device 110 and/or be passed to a downstream natural language understanding (NLU) module for interpreting the transcription 204 and performing a related action/operation if necessary.

When the utterance-level confidence score 350 fails to satisfy (e.g., is less than) the confidence threshold (e.g., decision block 450 is "No"), then the confidence-based routine rejects the transcription 204 generated by the first speech recognizer 200 and passes the audio data 202 to the second speech recognizer 402 for processing to re-transcribe the utterance 12. The transcription 204 generated by the second speech recognizer 402 may be passed back to the user device 110 and/or to the downstream NLU module for interpretation. In examples where the first speech recognizer 200 is local and executing on-device 110 and the second speech recognizer 402 is server-side and executing on a remote server 410, the confidence-based routine causes the user device 110 to transmit the audio data 202 to the remote server 410 via a network (not shown) so that the second speech recognizer 402 executing thereon can transcribe the utterance 12. The second speech recognizer 402 may leverage a large language model trained on large-scale language model training data making the second speech recognizer 402 more suitable for recognizing proper nouns or less-common words not present in the training data used to train the first speech recognizer 200.

In some examples, the first speech recognizer 200 is generally more accurate (e.g., achieves lower word error rates) for recognizing short-form utterances than the second speech recognizer 402 implementing the larger language model and lexicon, the first speech recognizer 200 may ultimately be less accurate at recognizing long-tail utterances than the second speech recognizer 402. As thus, the confidence-based routine may send all utterances with confidence scores 350 less than the confidence threshold to the second speech recognizer 402 for generating the transcription 204, and transcribe a majority of utterances on-device 110 using the first speech recognizer 200 to gain quality, latency, and reliability.

While the second speech recognizer 402 is shown as being server-side, the second speech recognizer 402 could also execute on-device. For instance, the second speech recognizer 402 may be associated with a more computationally-intensive speech recognizer that may generate more accurate speech recognition results on certain utterances than the first speech recognizer 200, but at the cost of reduced latency and increased power consumption. As such, the confidence-based routine may leverage the second speech recognizer 402 to transcribe utterances 12 when utterance-level confidence scores associated with recognition results generated by the first speech recognizer 200 are less than the confidence threshold.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
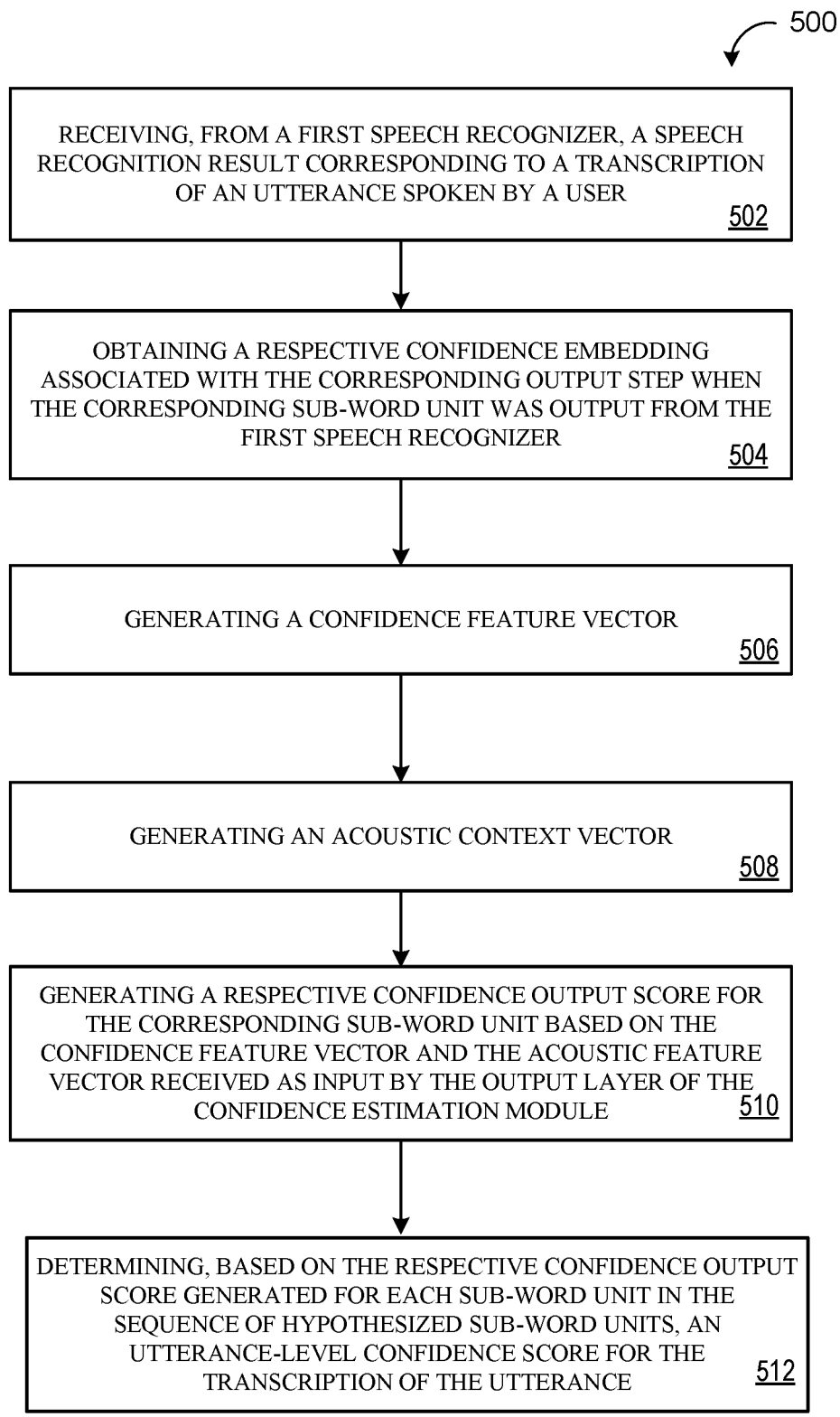
FIG. 5 is a flowchart of an example arrangement of operations for a method of determining an utterance-level confidence score of a transcription output by a speech recognizer

FIG. 5 is a flowchart of an example arrangement of operations for a method 500 of estimating word-level confidence for a word recognized by a speech recognizer using only a confidence of the final hypothesized sub-word unit for that word. The data processing hardware 112 (FIG. 1) may execute instructions stored on the memory hardware 114 (FIG. 1) to perform the example arrangement of operations for the method 500. At operation 502, the method 500 includes receiving, from a first speech recognizer 200, a speech recognition result 232 corresponding to a transcription 204 of an utterance 12 spoken by a user 10. The first speech recognizer 200 may be configured in a two-pass decoding architecture as discussed above with reference to FIGS. 2A and 2B. Here, the speech recognition result 232 is a highest-scoring candidate hypothesis re-scored by a rescoring decoder of the speech recognizer 200 and includes a sequence of hypothesized sub-word units that form one or more words of the utterance 12, each sub-word unit output from the speech recognizer 200 at a corresponding output step.

Using a confidence estimation module (CEM) 300, for each sub-word unit in the sequence of hypothesized sub-word units, the method 500 performs operations 504, 506, 508, 510. At operation 504, the method 500 includes obtaining a respective confidence embedding 242 that represents a set of confidence features associated with the corresponding output step when the corresponding sub-word unit was output from the first speech recognizer 200. At operation 506, the method 500 includes generating, using a first attention mechanism 310 that self-attends to the respective confidence embedding $b(y_i)$ 242 for the corresponding sub-word unit and the confidence embeddings $b(y_1)$-$b(y_{1-i})$ obtained for any other sub-word units in the sequence of hypothesized sub-word units that proceed the corresponding sub-word unit, a confidence feature vector SA(b). At operation 508, the method 500 includes generating, using a second attention mechanism 320 that cross-attends to a sequence of acoustic encodings e, err 252 each associated with a corresponding acoustic frame $x_T$ segmented from audio data 202 that corresponds to the utterance 12, an acoustic context vector CA(e) 322. At operation 510, the method 500 includes generating, as output from an output layer 340 of the CEM 300, a respective confidence output score 302 for the corresponding sub-word unit based on the confidence feature vector SA(b) and the acoustic feature vector CA(e) 322 received as input by the output layer of the CEM 300.

At operation 512, based on the respective confidence output score generated for each sub-word unit in the sequence of hypothesized sub-word units, the method 500 includes determining an utterance-level confidence score 350 for the transcription of the utterance. When the utterance-level confidence score 350 is less that a confidence threshold, the operations may further include rejecting the transcription 204 output by the first speech recognizer 200 and instructing a second speech recognizer 402 to process audio data 14 corresponding to the utterance to re-transcribe the utterance. The second speech recognizer 402 may be more computationally extensive than the first speech recognizer 200, and thus may be more accurate for performing speech recognition on the audio data 14 than the first speech recognizer 200. For instance, the first speech recognizer 200 may execute entirely on-device to provide streaming transcription capabilities with little latency, while the second speech recognizer 402 may execute on a remote server leveraging potentially infinite computing/memory resources for accurately performing speech recognition at reduced latency. As thus, a low utterance-level confidence score 350 for a transcription 204 output by the first speech recognizer 200 executing on-device may serve as an indicator to invoke the more computationally-intensive second speech recognizer 200. Without departing from the scope of the present disclosure, the second speech recognizer 402 could also execute on-device, but may be more computationally-intensive for improving speech recognition accuracy at the cost of reduced-latency and increased power consumption and computing.

Figure 6:
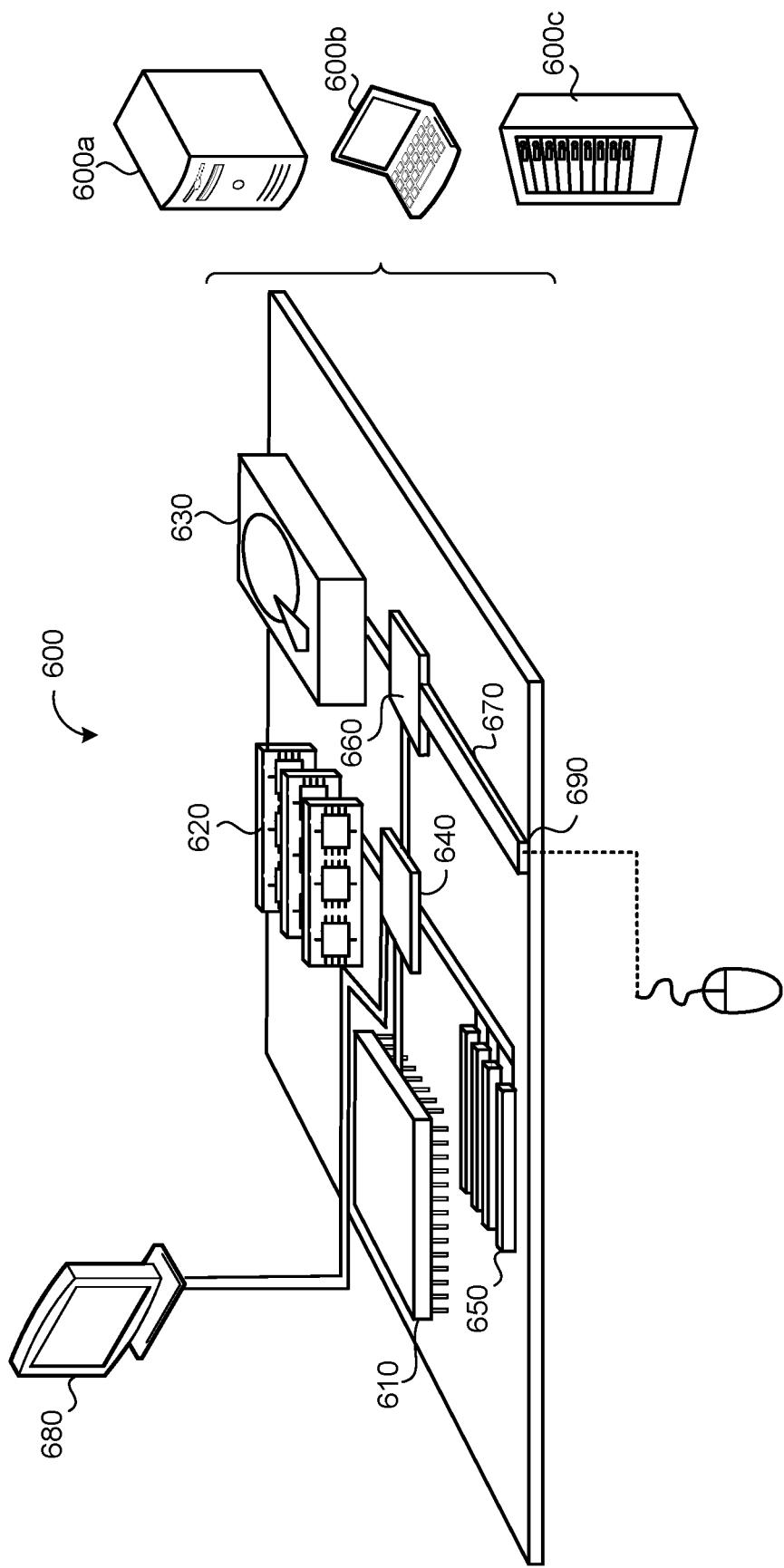
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
  receiving, from a first speech recognizer comprising an encoder and a decoder, a speech recognition result corresponding to a transcription of an utterance spoken by a user, the speech recognition result comprising a sequence of hypothesized sub-word units that form one or more words of the transcription of the utterance, each sub-word unit output from the first speech recognizer at a corresponding output step;
  using a confidence estimation module, for each sub-word unit in the sequence of hypothesized sub-word units:
    obtaining a respective confidence embedding associated with the corresponding output step when the corresponding sub-word unit was output from the first speech recognizer;
    generating, using a first attention mechanism that self-attends to the respective confidence embedding for the corresponding sub-word unit and the confidence embeddings obtained for earlier sub-word units in the sequence of hypothesized sub-word units that correspond to the same word from the one or more words as the corresponding sub-word unit, a confidence feature vector;
    generating, using a second attention mechanism that cross-attends to a sequence of encodings each associated with a corresponding acoustic frame segmented from audio data that corresponds to the utterance, an acoustic context vector; and
    generating, as output from an output layer of the confidence estimation module, a respective confidence output score for the corresponding sub-word unit based on the confidence feature vector and the acoustic context vector received as input by the output layer of the confidence estimation module;
  determining, based on the respective confidence output score generated for each sub-word unit in the sequence of hypothesized sub-word units, an utterance-level confidence score for the transcription of the utterance; and
  training the confidence estimation module and at least one of the encoder or the decoder of the first speech recognizer jointly on an utterance-level loss.

2. The computer-implemented method of claim 1, wherein determining the utterance-level confidence score for the transcription of the utterance comprises:
  for each word of the one or more words of the transcription of the utterance, determining a respective word-level confidence score that is equal to the respective confidence output score generated for the final sub-word unit in the corresponding word; and
  aggregating the respective word-level confidence scores determined for each of the one or more words of the transcription to determine the utterance-level confidence score for the transcription of the utterance.

3. The computer-implemented method of claim 1, where the operations further comprise:
  estimating, using a hierarchical attention mechanism, a probability that the speech recognition result for the utterance is recognized correctly; and
  determining the utterance-level loss for the speech recognition result based on an estimated probability that the that the-speech recognition result for the utterance is recognized correctly and a ground-truth label indicating whether or not the utterance is recognized correctly.

4. The computer-implemented method of claim 1, wherein the operations further comprise:
  estimating, at each position in a sequence of words of the utterance, a number of deletions;
  determining a deletion loss for the speech recognition result and the estimated number of deletions and a ground-truth number of deletions at each position in the sequence of words; and
  training the confidence estimation module on the deletion loss.

5. The computer-implemented method of claim 1, wherein the operations further comprise, after training the confidence estimation module, rescoring candidate speech recognition results recognized by the first speech recognizer.

6. The computer-implemented method of claim 1, wherein the sub-word units comprise wordpieces.

7. The computer-implemented method of claim 1, wherein the sub-word units comprise graphemes.

8. The computer-implemented method of claim 1, wherein the decoder comprises a transducer decoder model configured to generate multiple candidate hypotheses, each candidate hypothesis corresponding to a candidate transcription for the utterance and represented by a respective sequence of hypothesized sub-word units.

9. The computer-implemented method of claim 8, wherein the transducer decoder model comprises a Recurrent Neural Network-Transducer (RNN-T) model architecture.

10. The computer-implemented method of claim 1, wherein the operations further comprise:
   determining whether the utterance-level confidence score for the transcription of the utterance satisfies a confidence threshold; and
   when the utterance-level confidence score for the transcription of the utterance fails to satisfy the confidence threshold:
      rejecting the transcription output from the first speech recognizer; and
      instructing a second speech recognizer to process audio data corresponding to the utterance spoken by the user to re-transcribe the utterance spoken by the user.

11. The computer-implemented method of claim 10, wherein:
   the first speech recognizer resides on a user device associated with the user;
   the second speech recognizer executes on a remote server in communication with the user device; and
   the user device transmits the audio data to the remote server when the utterance-level confidence score for the transcription of the utterance fails to satisfy the confidence threshold.

12. The computer-implemented method of claim 10, wherein the second speech recognizer is more computationally-intensive than the first speech recognizer.

13. A system comprising:
   data processing hardware; and
   memory hardware in communication with the data processing hardware and storing instructions that when executed on the data processing hardware cause the data processing hardware to perform operations comprising:
      receiving, from a first speech recognizer comprising an encoder and a decoder, a speech recognition result corresponding to a transcription of an utterance spoken by a user, the speech recognition result comprising a sequence of hypothesized sub-word units that form one or more words of the transcription of the utterance, each sub-word unit output from the first speech recognizer at a corresponding output step;
      using a confidence estimation module, for each sub-word unit in the sequence of hypothesized sub-word units:
         obtaining a respective confidence embedding associated with the corresponding output step when the corresponding sub-word unit was output from the first speech recognizer;
         generating, using a first attention mechanism that self-attends to the respective confidence embedding for the corresponding sub-word unit and the confidence embeddings obtained for earlier sub-word units in the sequence of hypothesized sub-word units that correspond to the same word from the one or more words as the corresponding sub-word unit, a confidence feature vector;
         generating, using a second attention mechanism that cross-attends to a sequence of encodings each associated with a corresponding acoustic frame segmented from audio data that corresponds to the utterance, an acoustic context vector; and
         generating, as output from an output layer of the confidence estimation module, a respective confidence output score for the corresponding sub-word unit based on the confidence feature vector and the acoustic context vector received as input by the output layer of the confidence estimation module;
      determining, based on the respective confidence output score generated for each sub-word unit in the sequence of hypothesized sub-word units, an utterance-level confidence score for the transcription of the utterance;
      determining a deletion loss for the speech recognition result at each position in a sequence of words; and
      training the confidence estimation module and at least one of the encoder or the decoder of the first speech recognizer jointly on an utterance-level loss and the deletion loss.

14. The system of claim 13, wherein determining the utterance-level confidence score for the transcription of the utterance comprises:
   for each word of the one or more words of the transcription of the utterance, determining a respective word-level confidence score that is equal to the respective confidence output score generated for the final sub-word unit in the corresponding word; and
   aggregating the respective word-level confidence scores determined for each of the one or more words of the transcription to determine the utterance-level confidence score for the transcription of the utterance.

15. The system of claim 13, where the operations further comprise:
   estimating, using a hierarchical attention mechanism, a probability that the speech recognition result for the utterance is recognized correctly; and
   determining the utterance-level loss for the speech recognition result based on an estimated probability that the speech recognition result for the utterance is recognized correctly and a ground-truth label indicating whether or not the utterance is recognized correctly.

16. The system of claim 13, wherein the operations further comprise:
   estimating, at each position in the sequence of words of the utterance, a number of deletions;
   determining the deletion loss for the speech recognition result and the estimated number of deletions and a ground-truth number of deletions at each position in the sequence of words; and
   training the confidence estimation module on the deletion loss.

17. The system of claim 13, wherein the operations further comprise, after training the confidence estimation module, rescoring candidate speech recognition results recognized by the first speech recognizer.

18. The system of claim 13, wherein the sub-word units comprise wordpieces.

19. The system of claim 13, wherein the sub-word units comprise graphemes.

20. The system of claim 13, wherein the decoder comprises a transducer decoder model configured to generate multiple candidate hypotheses, each candidate hypothesis corresponding to a candidate transcription for the utterance and represented by a respective sequence of hypothesized sub-word units.

21. The system of claim 20, wherein the transducer decoder model comprises a Recurrent Neural Network-Transducer (RNN-T) model architecture.

22. The system of claim 13, wherein the operations further comprise:
determining whether the utterance-level confidence score for the transcription of the utterance satisfies a confidence threshold; and
when the utterance-level confidence score for the transcription of the utterance fails to satisfy the confidence threshold:
rejecting the transcription output from the first speech recognizer; and
instructing a second speech recognizer to process audio data corresponding to the utterance spoken by the user to re-transcribe the utterance spoken by the user.

23. The system of claim 22, wherein:
the first speech recognizer resides on a user device associated with the user;
the second speech recognizer executes on a remote server in communication with the user device; and
the user device transmits the audio data to the remote server when the utterance-level confidence score for the transcription of the utterance fails to satisfy the confidence threshold.

24. The system of claim 22, wherein the second speech recognizer is more computationally-intensive than the first speech recognizer.

* * * * *